H. M. LIPPER

May 26, 1931. HEADGEAR AND METHOD OF MAKING THE SAME Re. 18,081

Original Filed April 11, 1929 3 Sheets-Sheet 1

Witness:

By

Inventor
Harry M. Lipper;
Leonard L. Kalish
Attorney.

H. M. LIPPER

May 26, 1931. HEADGEAR AND METHOD OF MAKING THE SAME Re. 18,081

Original Filed April 11, 1929 3 Sheets-Sheet 2

Witness:

Inventor
Harry M. Lipper,
By Leonard L. Kalish
Attorney

H. M. LIPPER

May 26, 1931. HEADGEAR AND METHOD OF MAKING THE SAME Re. 18,081

Original Filed April 11, 1929 3 Sheets-Sheet 3

Witness:

Inventor
Harry M. Lipper,
By Leonard L. Kalish
Attorney

Reissued May 26, 1931 Re. 18,081

UNITED STATES PATENT OFFICE

HARRY M. LIPPER, OF ATLANTIC CITY, NEW JERSEY, ASSIGNOR TO LIPPER MANUFACTURING COMPANY, A CORPORATION OF PENNSYLVANIA

HEADGEAR AND METHOD OF MAKING THE SAME

Original No. 1,720,560, dated July 9, 1929, Serial No. 354,191, filed April 11, 1929. Application for reissue filed February 3, 1931. Serial No. 513,238.

My invention relates to headdress, particularly for women's wear, whereby the wearer may form, shape and assemble a hat directly upon her head so as to form a finished headdress having all the characteristic appearance of a permanently shaped and assembled hat, but capable of being remounted and assembled at will, by the wearer, to fit any size head, and being generally soft and limp and having its shape retained when mounted or assembled upon the head, solely by the contour of the head of the wearer.

My invention further relates to a novel method of making a head-gear or head-dress of the character stated.

For the purpose of illustrating my invention, I have shown in the accompanying drawings forms thereof which are at present preferred by me, since the same have been found in practice to give satisfactory and reliable results although it is to be understood that the various instrumentalities of which my invention consists can be variously arranged and organized and that my invention is not limited to the precise arrangement and organization of the instrumentalities as herein shown and described.

Referring to the drawings in which like reference characters indicate like parts, Figure 1 represents a rear perspective view of my novel head gear, mounted upon the head of the wearer, before it is assembled.

My invention consists generally of a head gear formed of a relatively limp and elastic textile fabric, including a generally elongated body composed of a terminal head-pocket portion and a pair of elongated streamers extending from said head-pocket portion to the opposed end of the body.

In carrying out my invention, the head gear 20 of my novel construction is formed of an elastic and yet limp textile fabric, preferably a knitted textile fabric of any suitable material, including the generally crown-shaped head pocket portion 21 at the front end of the head gear and the pair of rearwardly extending streamers 22 and 23, forming a continuation of the generally crown-shaped front terminal head pocket 21.

The streamers 22 and 23 are approximately twice as long as the head pocket portion 21, or longer, and are preferably narrower at their free ends and are preferably formed integrally with the terminal head-pocket portion 21.

Figure 1:
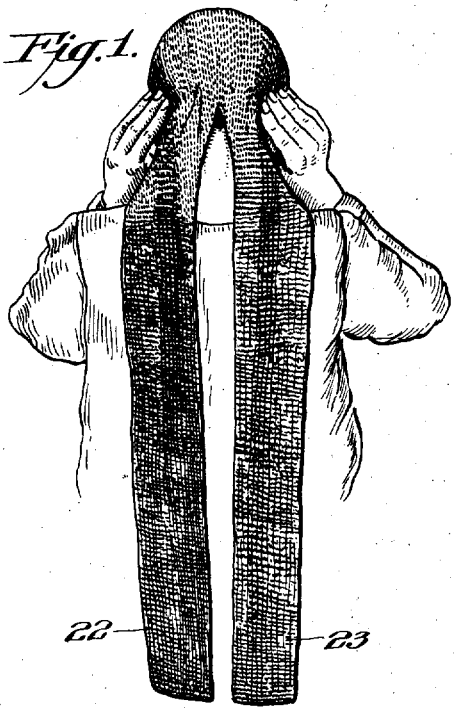
Figure 2:
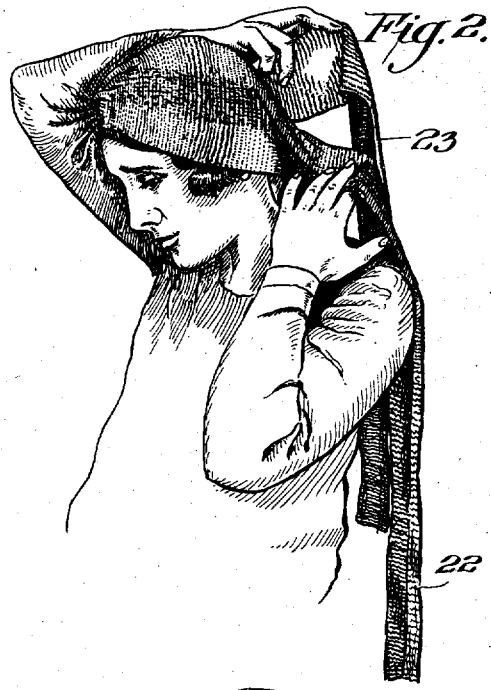
Figure 2 represents a perspective view, taken generally in side elevation, showing the first step or stage in the assembling or wrapping of the hat embodying my invention.

The head gear of my novel construction is applied to the head of the wearer in the manner indicated particularly in Figures 1 to 8 inclusive of the drawings. Thus the front terminal pocket portion 21 is first fitted over or drawn over the head of the wearer as shown in Figures 1 and 2, producing the smooth crown portion of the completely assembled head dress, by reason of the elastic character of the fabric.

Figure 3:
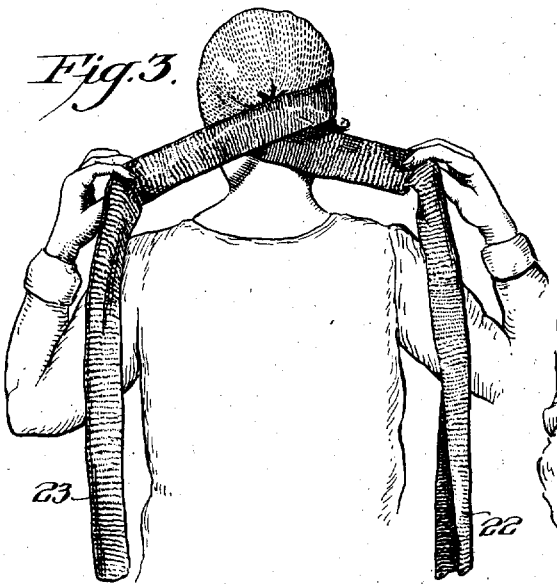
Figure 3 represents a perspective view of the same, taken generally in rear elevation, illustrating the second step in the wrapping of the novel hat embodying my invention.
Figure 4:
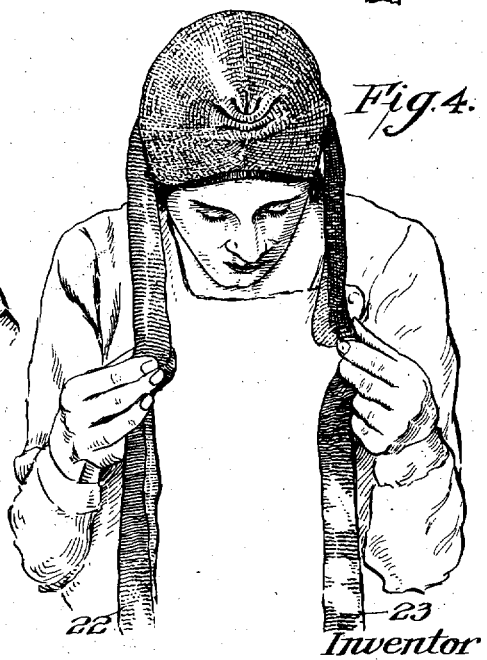
Figure 4 represents a similar perspective view taken generally in side elevation, illustrating the third step in the wrapping of the hat.

The two elongated and rearwardly extending streamers 22 and 23 are then crossed at the back of the head as indicated in Figures 2 and 3 and drawn forwardly as indicated in Fig. 4.

Figure 5:
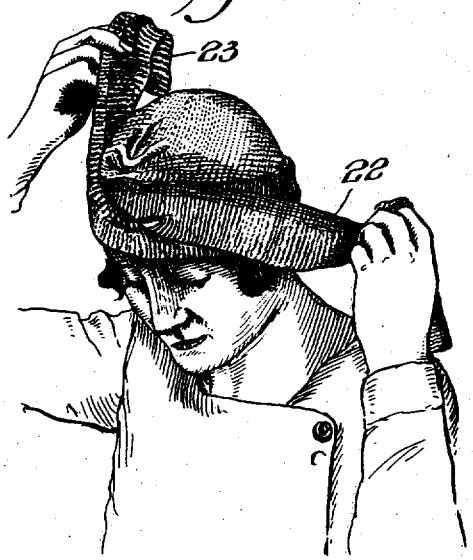
Figure 5 represents a similar perspective view, illustrating the fourth step in the wrapping or assembling of the novel hat embodying my invention.
Figure 8:
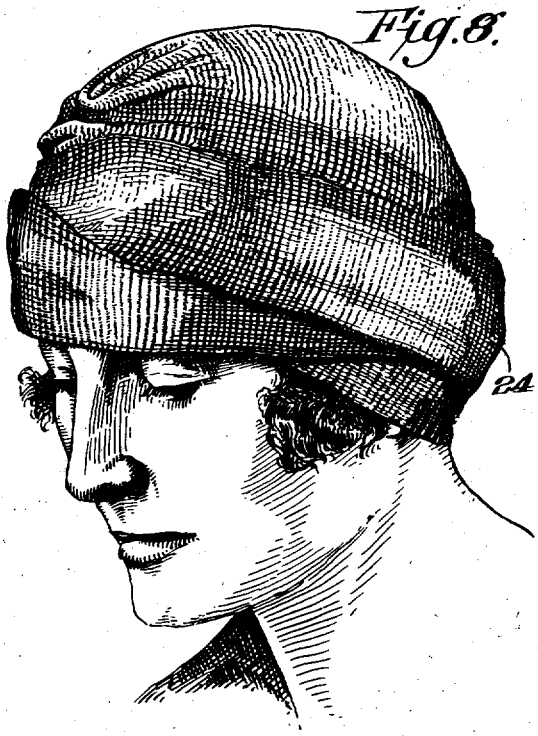
Figure 8 represents a perspective view, of the completely wrapped or assembled hat, embodying my invention, shown generally in a semi-profile.
Figure 6:
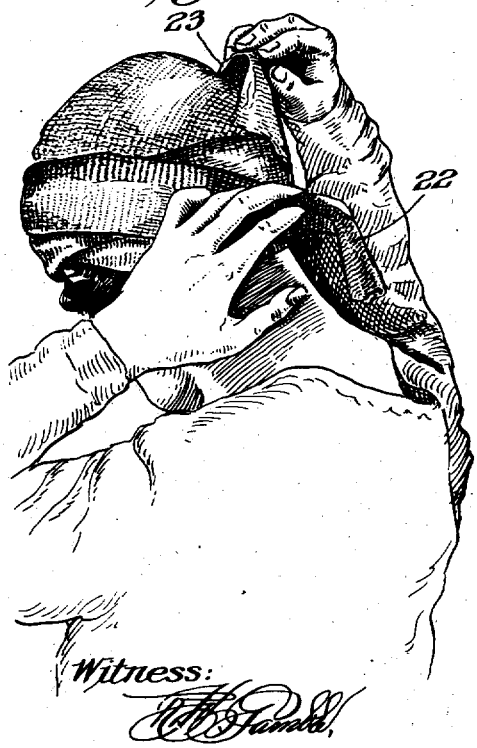
Figure 6 represents a similar perspective view, showing the fifth step in the wrapping of my novel hat.
Figure 7:
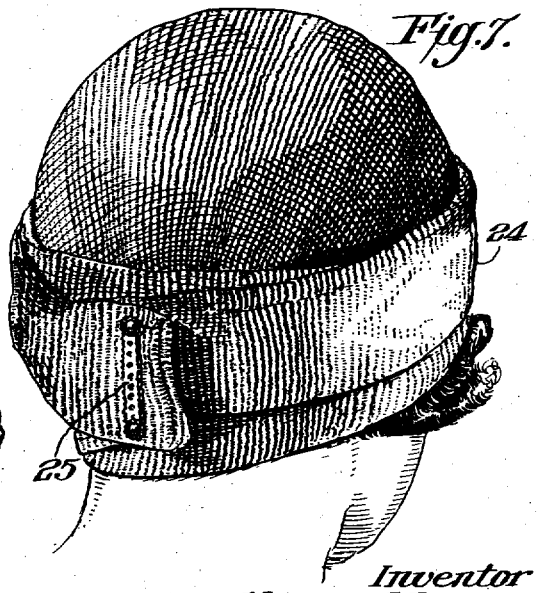
Figure 7 shows a rear perspective view of the hat completely assembled or wrapped around the head of the wearer.

In front, the streams 22 and 23 are again crossed as indicated in Figure 5 and are extended rearwardly around the base of the crown portion or head pocket portion 21, so as to form a generally enlarged rim portion 24.

The free ends of the two streamers 22 and 23 may then be secured to each other and to the body of the rim portion 24, by means of any suitable fastening device, such as a clasp or pin 25.

Figure 9:
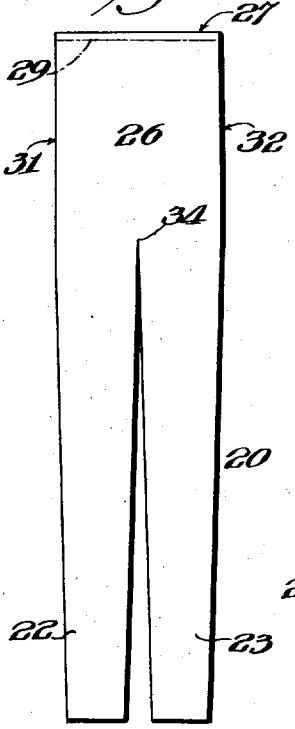
Figure 9 represents a diagrammatic plan view of a blank of which the head gear of my invention is adapted to be made.
Figure 11:
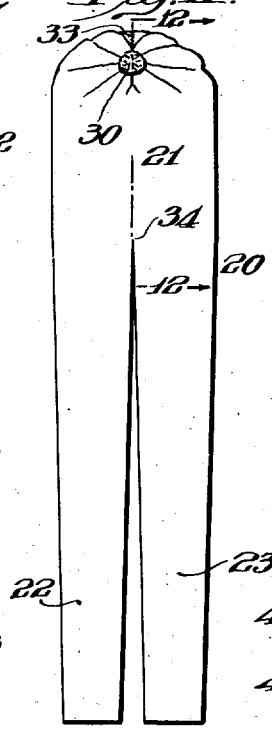
Figure 11 represents a top plan view, in perspective, showing the formation of the terminal head-pocket portion.
Figure 10:
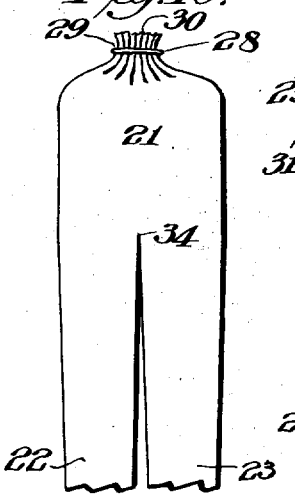
Figure 10 represents a similar top plan view of a blank (partly broken away) illustrating the second step in the making of the same.
Figure 12:
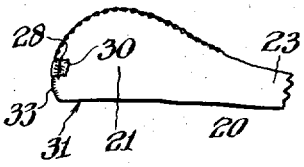
Figure 12 represents a section generally on line 12—12 of Figure 11 showing the relation of the terminal head-pocket of the two streamers formed thereon.

The novel head gear embodying my invention may be formed in several ways, to produce the body having the front crown-shaped head-pocket portion and the rearwardly extending streamers. Thus the front pocket portion may be formed of a relatively wide, flat blank portion 26, which continues rearwardly in the two narrower and generally tapering streamers 22 and 23, as illustrated in Figure 9. In order to form the crown-shaped head pocket portion 21, the entire front edge 27 of the blank portion 26 is suitably gathered as indicated at 28 in Figure 10, along the line indicated generally by the numeral 29. This produces a knot 30 at the front of the head-pocket portion 21. The two opposed edges 31 and 32, of the wide blank portion 26, may then be stitched or sewed together for a short distance (about an inch or so) below the knot 30, so as to form a deeper head-pocket 21, as indicated more particularly in Figures 11 and 12. The short seamed portion below the knot 30 is indicated in Figures 11 and 12 by the numeral 33.

The blank shown in Figure 9 is preferably knitted integrally on a flat knitting machine or other suitable machine, beginning with the upper edge 27. Thus from the point 34 on down to the ends of the streamers, the knitting is divided into two, and the two separate portions or streamers 22 and 23 are then gradually narrowed down to their lower ends.

Figure 13:
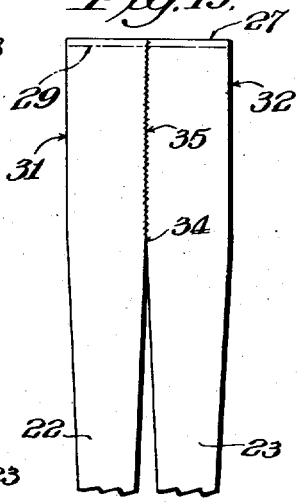
Figure 13 represents a top plan view of a blank (partly broken away) similar to that shown in Figure 9, illustrating an alternative method of forming the same.

If desired the same type of blank as illustrated in Figure 9, may be formed by merely sewing together two streamers, as indicated in Figure 13. Thus in this modified construction the streamers 22 and 23 are merely stitched or sewed together along a median line 35, for a suitable length, up to the dividing point 34. Thereafter the head-pocket portion 21 may be formed in a manner similar to that illustrated in Figures 9 to 12 inclusive, by gathering in the front edge 27 of the blank along a line indicated generally by the numeral 29, so as to form the knot 30, and seaming together the side edges 31 and 32 for a short distance immediately adjacent to or below the knot 30.

Figure 14:
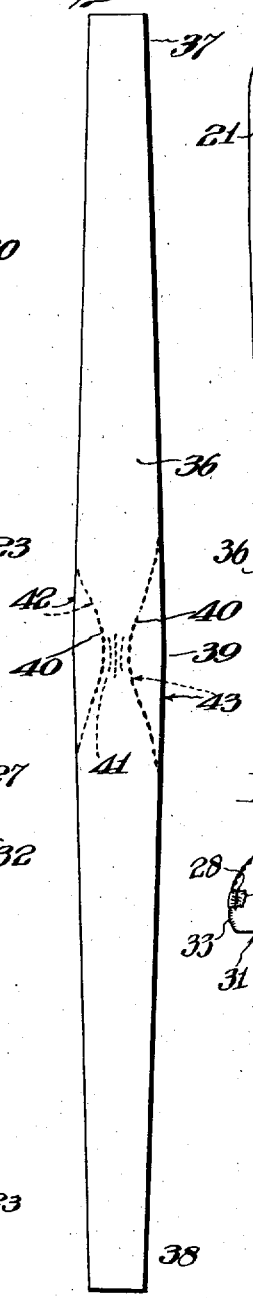
Figure 14 represents a top plan view of a blank of a modified construction embodying my invention.
Figure 15:
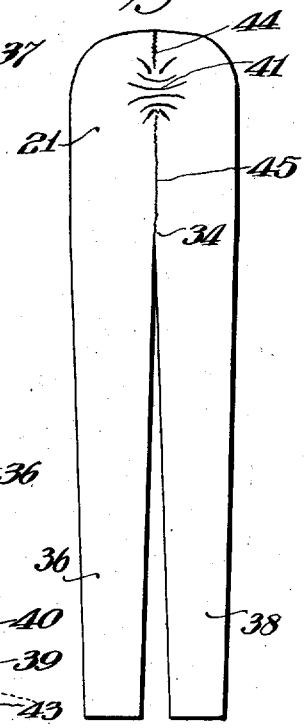
Figure 15 represents a top plan view of the completed head gear of the modified construction formed of the blank shown in Figure 14.

In Figures 14 and 15 I have illustrated a further modified method of making my novel head gear embodying my invention. In this modification, a single continuous band 36, constitutes the blank, and it may be similarly knitted on a flat knitting machine in a continuous manner, with the two ends 37 and 38 thereof narrow and the center 39 thereof slightly wider so as to produce the two halves tapering down from the center to the opposed ends. The blank 36 is then gathered in as indicated by the dotted lines 40. After the blank has been gathered in to form the generally knot shape portion 41, the edges 42 and 43 are sewed together to form the seams 44 and 45 respectively below and above the knot portion 41 of the completed head gear, as shown in Figure 15. The seam 44 below the knot portion 41 is relatively short (about an inch or so) and is provided so as to produce a deeper head-pocket portion 21. The seam 45 is sufficiently long to produce the desired length of head-pocket portion.

In either one of the several methods shown in Figures 9 to 15 inclusive, the finally formed head-pocket portion 21 is turned inside out as indicated in Figure 12, so as to bring the gathered knot 30 on the inside.

In either of the above embodiments of my invention, the fabric is preferably knitted so that the head-pocket portion will be elastic or yielding in a transverse direction.

In knitting the blank shown in Figure 9, as well as the other blanks, the knitting is carried out on a flat knitting machine, as pointed out hereinabove, and by reason of the streamers 22 and 23 being knitted to shape, their longitudinal edges will be selvaged and will not unravel or fray.

The head gear embodying my invention, described hereinabove, possesses the unique advantage of being capable of fitting any head size, of being capable of being shaped to any head and of being light, limp and resilient so as not only to produce a very comfortable head dress, but one which will be artistic and may be assembled upon the head of the wearer in a way to simulate a permanently formed or shaped hat.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described my invention, what I hereby claim as new and desire to secure by Letters Patent, is:

1. A head gear formed of generally limp and elastic knitted fabric, including a head-pocket portion adapted to fit snugly over the head of the wearer to form the crown of the assembled head dress and a generally elongated streamer portion at least approximately twice as long as the head-pocket portion and extending from an end thereof, adapted to surround the lower periphery of the head-pocket portion to form the rim of the assembled head dress; the shape of the head dress, when mounted upon the head of the wearer, being maintained by the contour of the head of the wearer.

2. A head gear comprising a generally elongated body formed of transversely elastic knitted fabric, including a head-pocket portion and a streamer portion at least approximately twice as long as the head-pocket portion, said head-pocket portion being adapted to form the crown of the assembled head dress and said streamer portion being adapted to surround the lower periphery of said head-pocket portion to form the rim of the assembled head dress.

3. A head gear formed of generally limp and elastic knitted fabric, including a head-pocket portion adapted to fit snugly over the head of the wearer to form the crown of the assembled head dress and a pair of generally elongated streamer portions at least approximately twice as long as the head-pocket portion and extending from an end thereof, adapted to surround the lower periphery of the head-pocket portion to form the rim of the assembled head dress; the shape of the head dress, when mounted upon the head of the wearer, being maintained by the contour of the head of the wearer.

4. A head gear comprising a generally elongated body formed of transversely elastic knitted fabric, including a head-pocket portion and a pair of streamer portions at least approximately twice as long as the head-pocket portion, said head-pocket portion being adapted to form the crown of the assembled head dress and said streamer portions being adapted to surround the lower periphery of said head-pocket portion to form the rim of the assembled head dress.

5. A head gear comprising a generally elongated body formed of generally limp and transversely elastic knitted fabric, including a head-pocket portion adapted to fit snugly over the head to form the crown of the assembled head dress, and a pair of generally elongated streamer portions at least approximately twice as long as said head-pocket portion extending therefrom, adapted to surround said head pocket portion to form the rim of the assembled head dress when in use; the shape of the head dress, when mounted upon the head of the wearer, being maintained by the contour of the head of the wearer.

In witness whereof, I have hereunto set my hand this 30th day of January, 1931.

HARRY M. LIPPER.